(12) United States Patent
Endo (10) Patent No.: US 7,586,294 B2
(45) Date of Patent: Sep. 8, 2009

(54) CURRENT RESONANCE TYPE DC/DC CONVERTER ACTUALIZING A STABLE ZERO-CURRENT SWITCHING

(75) Inventor: Naoto Endo, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 35 days.

(21) Appl. No.: 11/413,726

(22) Filed: Apr. 28, 2006

(65) Prior Publication Data

US 2007/0018619 A1 Jan. 25, 2007

(30) Foreign Application Priority Data

Jul. 19, 2005 (JP) ............... 2005-209141

(51) Int. Cl.
G05F 1/40 (2006.01)
G05F 1/00 (2006.01)

(52) U.S. Cl. .................. 323/235; 323/224; 323/222; 323/282

(58) Field of Classification Search ........... 323/222, 323/224, 235, 271, 282, 283, 284, 285, 287, 323/290; 363/16, 17, 19, 21, 21.03, 23, 25, 363/28, 74, 78, 97, 131
See application file for complete search history.

(56) References Cited

U.S. PATENT DOCUMENTS

| | | | |
|---|---|---|---|
| 4,720,667 A | 1/1988 | Lee et al. | |
| 5,521,809 A | 5/1996 | Ashley et al. | |
| 5,636,106 A | 6/1997 | Batarseh et al. | |
| 5,663,635 A | 9/1997 | Vinciarelli et al. | |
| 5,712,772 A * | 1/1998 | Telefus et al. | 363/21.02 |
| 5,920,182 A | 7/1999 | Migliavacca | |
| 6,038,154 A | 3/2000 | Boylan et al. | |
| 6,211,701 B1 * | 4/2001 | Kuijk et al. | 326/83 |
| 6,285,174 B1 | 9/2001 | Suzuki | |
| 6,700,801 B2 | 3/2004 | Morita et al. | |
| 6,710,582 B2 | 3/2004 | Watanabe | |
| 6,867,986 B2 * | 3/2005 | Amei | 363/21.01 |
| 7,002,323 B2 | 2/2006 | Natori | |
| 7,006,362 B2 | 2/2006 | Mizoguchi et al. | |
| 7,027,313 B2 * | 4/2006 | Amei | 363/21.12 |
| 7,049,774 B2 | 5/2006 | Chin et al. | |

(Continued)

OTHER PUBLICATIONS

Related U.S. Appl. No. 11/412,012, filed Apr. 26, 2006; Inventor: Endo, Naoto.; and.

(Continued)

Primary Examiner—Akm E Ullah
Assistant Examiner—M'Baye Diao
(74) Attorney, Agent, or Firm—Frishauf, Holtz, Goodman & Chick, P.C.

(57) ABSTRACT

In a current resonance type DC/DC converter for converting an input voltage into an output voltage, a control circuit has an edge detection circuit for detecting edges of a driving control signal and a particular voltage to produce a logic control signal and a logic voltage signal, respectively, an error amount calculating arrangement for calculating an error amount on the basis of the logic control signal and the logic voltage signal, an off timing determining arrangement for determining an off timing of an energizing switch so as to make the error amount small, and a driving control signal generating arrangement for generating the driving control signal on the basis of the determined off timing.

8 Claims, 5 Drawing Sheets

U.S. PATENT DOCUMENTS

| | | |
|---|---|---|
| 7,224,149 B2 | 5/2007 | Endo |
| 2001/0011921 A1 | 8/2001 | Ooishi |
| 2003/0095421 A1* | 5/2003 | Kadatskyy et al. ............ 363/65 |
| 2004/0239298 A1 | 12/2004 | Norrga et al. |
| 2004/0239299 A1 | 12/2004 | Vinciarelli |
| 2007/0018618 A1 | 1/2007 | Endo |
| 2007/0200540 A1* | 8/2007 | Hashimoto et al. .......... 323/282 |

OTHER PUBLICATIONS

Related U.S. Appl. No. 11/413,557, filed Apr. 28, 2008; Inventor: Endo, Naoto.

* cited by examiner

CURRENT RESONANCE TYPE DC/DC CONVERTER ACTUALIZING A STABLE ZERO-CURRENT SWITCHING

This application claims priority to prior application JP 2005-209141, the disclosure of which is incorporated herein by reference.

BACKGROUND OF THE INVENTION

This invention relates to a power converter and, in particular, to a current resonance type DC/DC converter including a resonance circuit and a method of actualizing a zero-current switching therefor.

In the manner which is well known in the art, the DC/DC converter is a power converter for converting an input DC voltage (which will later be merely also called an "input voltage") into an output DC voltage (which will later be merely also called an "output voltage") which is different from the input DC voltage.

As one of the DC/DC converters, there is a PWM (pulse width modulation) type DC/DC converter is known in the art. The PWM type DC/DC converters have various types which are classified into a step-down type, a step-up type, a polarity reversing type, or the like. The step-down PWM type DC/DC converter comprises an energizing switch, a short-circuit switch, and an output inductor. In lieu of the short-circuit switch, a diode may be used.

However, the PWM type DC/DC converter is disadvantageous in that it has a large switching loss when the energizing switch changes from an on state to an off state or changes from an off state to an on state. As a DC/DC converter which is capable of eliminating such a switching loss, a current resonance type DC/DC converter is known, for example, in U.S. Pat. No. 5,663,635 issued by Vinciarelli et al.

Although the current resonance type DC/DC converter will later be described in conjunction with FIG. 1, the current resonance type DC/DC converter comprises a current resonance type DC/DC converting portion which includes an energizing switch being turned on and off in response to a driving control signal and a series resonance circuit. The series resonance circuit consists of a resonance inductor and a resonance capacitor. The resonance inductor has an end connected to the energizing switch. The resonance capacitor has an end connected to another end of the resonance inductor.

In the current resonance type DC/DC converter, a current flows through the resonance inductor only for a resonance duration with respect to a switching period. The current does not flow through the resonance inductor for a duration obtained by removing the resonance duration from the switching period. When an input/output voltage ratio becomes smaller, the switching period with respect to the resonance duration becomes longer. As a result, durations where the current does not flow through the resonance inductor increase, as described, for example, in U.S. Pat. No. 4,720,667 issued by Lee et al.

The current resonance type DC/DC converter has a large advantage where a zero-current switching of the energizing switch is enable by using a series resonance of the series resonance circuit consisting of the resonance inductor and the resonance capacitor, and it results in eliminating the switching loss.

Accordingly, to take the advantage of the current resonance type DC/DC converter, it is necessary to carrying out the switching of the energizing switch by precisely detecting a time instant when the current flowing through the energizing switch becomes zero.

Conventionally, as methods of actualizing the zero-current switching, which will later also be called ZCS for short, first and second conventional methods are adopted in the manner which will be later described in conjunction with FIGS. 2 and 3. The first conventional method (ZCS) is a method (ZCS) of inserting a detection resistor in series in the circuit. The second conventional method (ZCS) is a method (ZCS) of using a voltage drop due to an ON resistance of the energizing switch and a parasitic resistance of the resonance inductor.

The current resonance type DC/DC converter actualizing the first conventional ZCS comprises the detection resistor and a zero-current detection circuit. The current resonance type DC/DC converter actualizing the second conventional ZCS includes a resistance component extraction type zero-current detection circuit.

Incidentally, in practical products, the resonance frequency determined by a time constant of the resonance inductor and the resonance capacitor of the current resonance type DC/DC converting portion is several MHz or more. Therefore, in the ZCS actualizing methods, it is necessary to make a resistance value of the detection resistor or a resistance value of a combined resistance component of the energizing switch and the resonance inductor a sufficient large value in comparison with a parasitic impedance component of respective parts, patterns, and so on.

To name a concrete example thereof, it will be assumed that the resonance frequency determined by the time constant of the resonance inductor and the resonance capacitor of the current resonance type DC/DC converting portion is 2 MHz. The combined resistance component has the resistance value of several mΩ while the parasitic inductance component has an inductance value of hundreds of mH. Under the circumstances, it is impossible to precisely detect the current flowing through the energizing switch.

However, if the resistance value of the detection resistor or the resistance value of the combined resistance component makes larger than that of the parasitic inductance component, it is impractical because the current resonance type DC/DC converting portion has a large loss.

Conversely, it may be considered to detect the current flowing through the energizing switch by using, as the resistance value of the detection resistor or the resistance value of the combined resistance component, a small value which becomes negligible as the loss of the current resonance type DC/DC converting portion. In this even, however, a high-precision and complicated circuit becomes required as the zero-current detection circuit or the resistance component extraction type zero-current detection circuit.

SUMMARY OF THE INVENTION

It is therefore an object of the present invention to provide a current resonance type DC/DC converter which is capable of actualizing a stable zero-current switching without an increased loss and detection of a current flowing through an energizing switch by assembling a complicated circuit.

Other objects of this invention will become clear as the description proceeds.

On describing the gist of a first aspect of this invention, it is possible to be understood that a method is performing a zero-current switching of an energizing switch for use in a current resonance type DC/DC converter including the energizing switch being turned on/off in response to a driving control signal, a resonance inductor having an end connected to the energizing switch, and a resonance capacitor having an end connected to another end of the resonance inductor. According to the first aspect of this invention, the method comprises the step of generating the driving control signal so as to turn the energizing switch off at a timing when a current flowing through the energizing switch substantially becomes zero by a feedback loop using the driving control signal and a particular voltage between the energizing switch and the resonance inductor.

In the above-mentioned method, the method may comprises the steps of detecting edges of the driving control signal and the particular voltage to produce a logic control signal and a logic voltage signal, respectively, of calculating an error amount on the basis of the logic control signal and the logic voltage signal, of determining an off timing of the energizing switch so as to make the error amount small to produce a determined off timing, and of generating the driving control signal on the basis of the determined off timing.

On describing the gist of a second aspect of this invention, it is possible to be understood that a current resonance type DC/DC converter comprises a current resonance type DC/DC converting portion which includes an energizing switch being turned on/off in response to a driving control signal, a resonance inductor having an end connected to the energizing switch, and a resonance capacitor having an end connected to another end of the resonance inductor.

According to the second aspect of this invention, the current resonance type DC/DC converter comprises a control circuit for generating the driving control signal so as to turn the energizing switch off at a timing when a current flowing through the energizing switch substantially becomes zero by a feedback loop using the driving control signal and a particular voltage between the energizing switch and the resonance inductor.

According to the second aspect of this invention, in the above-mentioned current resonance type DC/DC converter, the current resonance type DC/DC converting portion may comprise a full-wave current resonance type DC/DC converting portion. The full-wave current resonance type DC/DC converting portion may comprise a step-down full-wave current resonance type DC/DC converting portion. The control circuit preferably may comprise an edge detection circuit for detecting edges of the driving control signal and the particular voltage to produce a logic control signal and a logic voltage signal, respectively, an error amount calculating arrangement for calculating an error amount on the basis of the logic control signal and the logic voltage signal, an off timing determining arrangement for determining an off timing of the energizing switch so as to make the error amount small to produce a determined off timing, and a driving control signal generating arrangement for generating the driving control signal on the basis of the determined off timing.

The energizing switch may comprise an N-channel metal oxide semiconductor field effect transistor (MOSFET). The driving control signal may comprise a driving gate signal supplied to a gate electrode of the N-channel MOSFET. The particular voltage may comprise a source voltage between a source electrode of the N-channel MOSFET and an end of the resonance inductor. In this event, the edge detection circuit desirably may comprise a reference voltage generating circuit for generating a reference voltage, a first comparison circuit for comparing the reference voltage with the driving gate signal to produce, as the logic control signal, a logic gate signal, and a second comparison circuit for comparing the reference voltage with the source voltage to produce, as the logic voltage signal, a logic source signal. The error amount calculating arrangement may comprise an inverter gate for inverting the logic gate signal to produce an inverted logic gate signal, and an AND gate for ANDing the inverted logic gate signal and the logic source signal to produce an ANDed result signal as a time-base error signal indicative of a length of the error signal on a time base. The off timing determining arrangement may comprise a time-base/voltage level converting arrangement for converting the time-base error signal into a voltage level error signal, a timer for producing a timer signal having a predetermined sawtooth waveform, a comparator for comparing the voltage level error signal with the timer signal to produce a comparison result signal, and an off timing generating circuit for generating, in response to the comparison result signal, an off timing signal indicative of the off timing of the energizing switch. The driving control signal generating arrangement may comprise a logic circuit for producing an original gate signal in response to the off timing signal, and a driver circuit for supplying the driving gate signal to the gate electrode of the energizing switch in response to the original gate signal.

DESCRIPTION OF THE PREFERRED EMBODIMENT

Figure 1:
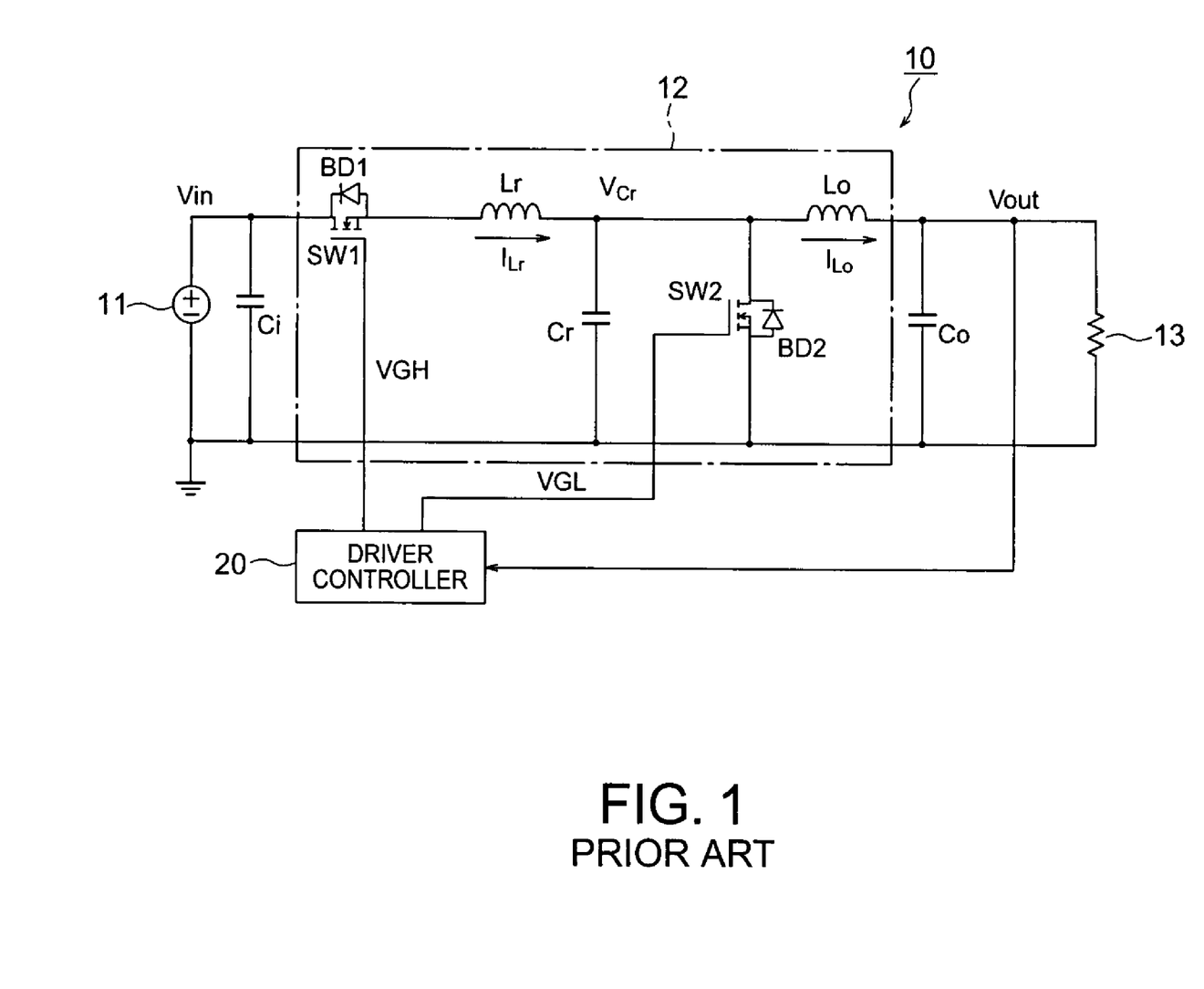
FIG. 1 is a block diagram showing structure of a conventional full-wave current resonance DC/DC converter of a step-down type and a synchronous type.

Referring to FIG. 1, a conventional current resonance type DC/DC converter 10 will first be described in order to facilitate an understanding of the present invention. In the example being illustrated, the current resonance type DC/DC converter 10 is a full-wave current resonance type DC/DC converter. The illustrated full-wave current resonance type DC/DC converter 10 is a step-down type and a synchronous type. That is, an output voltage Vout is lower than an input voltage Vin. An input power supply 11 is connected in parallel with an input capacitor Ci. A load 13 is connected in parallel with a capacitance element (an output capacitor) Co. Between the input capacitor Cin and the output capacitor Co, a full-wave current resonance type DC/DC converting portion 12 is connected.

The full-wave current resonance type DC/DC converting portion 12 comprises an energizing switch SW1, a short-circuit switch SW2, an output inductor Lo, a resonance inductor Lr, and a resonance capacitor Cr. A combination of the resonance inductor Lr and the resonance capacitor Cr constitutes a series resonance circuit. The series resonance circuit is inserted between the energizing switch SW1 and the short-circuit switch SW2.

The energizing switch SW1 is also called a first switch while the short-circuit switch SW2 is also called a second switch. Each of the energizing switch SW1 and the short-circuit switch SW2 comprises an N-channel metal oxide semiconductor field effect transistor (MOSFET). A first body diode BD1 is parasitic on the first switch SW1 while a second body diode BD2 is parasitic on the second switch SW2.

More specifically, the energizing switch SW1 has a source electrode which is equivalently connected to an anode electrode of the first body diode BD1. The energizing switch SW1 has a drain electrode which is equivalently connected to a cathode electrode of the first body diode BD1. The short-circuit switch SW2 has a source electrode which is equivalently connected to an anode electrode of the second body diode BD2. The short-circuit switch SW2 has a drain electrode which is equivalently connected to a cathode electrode of the second body diode BD2.

That is, the full-wave current resonance type DC/DC converting portion 12 is similar in structure to the above-mentioned PWM type DC/DC converter except that the series resonance circuit consisting of the resonance inductor Lr and the resonance capacitor Cr is added.

The energizing switch (the first switch) SW1 has an end (the drain electrode) connected to a positive electrode of the input power supply 11. The energizing switch (the first switch) SW1 has another end (the source electrode) connected to an end of the resonance inductor Lr. The resonance inductor Lr has another end which is grounded through the resonance capacitor Cr. The short-circuit switch (the second switch) SW2 is connected in parallel with the resonance capacitor Cr. Specifically, the short-circuit switch SW2 has an end (the drain electrode) connected to a connection node between the resonance inductor Lr and the resonance capacitor Cr. The short-circuit switch SW2 has another end (the source electrode) which is grounded. The other end of the resonance inductor Lr is also connected to an end of the output inductor Lo. The output inductor Lo has another end which is grounded through the output capacitor Co. The output capacitor Co has both ends between which the output voltage Vout occurs.

The first switch (the energizing switch) SW1 is also called a high-side switch while the second switch (the short-circuit switch) SW2 is also called a low-side switch. Control of turning on/off of the energizing switch SW1 and the short-circuit switch SW2 is carried out by first and second driving control signals VGH and VGL supplied from a driver controller 20 which serves as a control circuit. More specifically, the driver controller 20 supplies, as the first driving control signal, a driving high-side gate signal VGH to a gate electrode of the energizing switch SW1 while the driver controller 20 supplies, as the second driving control signal, a driving low-side gate signal VGL to a gate electrode of the short-circuit switch SW2.

Referring now to FIG. 1, description will be made as regards operation of the full-wave current resonance type DC/DC converter 10.

It will first be assumed that the first switch SW1 is put into an off state while the second switch SW2 is put into an on state. In this event, a current $I_{Lo}$ flowing through the output inductor Lo and a current $I_{SW2}$ flowing through the second switch SW2 linearly decrease at an inclination of −Vout/Lo.

Subsequently, it will be assumed that both of the first and the second switches SW1 and SW2 are put into the off state. A time duration where both of the first and the second switches SW1 and SW2 are put into the off state is called a dead time. For a duration of the dead time, the current $I_{SW2}$ flowing through the second switch SW2 becomes zero while a current $I_{BD2}$ flows through the second body diode BD2 in place of the second switch SW2.

It will be assumed that the first switch SW1 is turned on while the second switch SW2 is turned off. In this event, a current $I_{SW1}$ flowing through the first switch SW1 linearly increases at an inclination of Vin/Lo. On the other hand, the current $I_{BD2}$ flowing through the second body diode BD2 decreases with increase in the current $I_{SW1}$ flowing through the first switch SW1. Under the circumstances, a both-ends voltage $V_{Cr}$ of the resonance capacitor Cr is clamped to zero volt by the second body diode BD2.

At a time instant after a lapse of a first time interval T1= $(I_{Lo}Lr)/V$in from a time instant when the first switch SW1 is turned on, the current $I_{SW1}$ flowing through the first switch SW1 and a current $I_{Lo}$ flowing through the output inductor Lo are equal to each other, namely, $(I_{SW1}=I_{Lo})$, and then the series resonance circuit starts resonance. Accordingly, a current $I_{Cr}$ flowing in the resonance capacitor Cr increases gradually, reaches a peak, and thereafter decreases gradually. In this event, the both-end voltage $V_{Cr}$ of the resonance capacitor Cr increases gradually to become a voltage 2Vin which is twice as much as the input voltage Vin. When the current $I_{Cr}$ flowing in the resonance capacitor Cr reaches the peak, the both-ends voltage $V_{Cr}$ of the resonance capacitor Cr is equal to the input voltage Vin.

A second time interval T2 where the current $I_{Cr}$ flows in the resonance capacitor Cr (namely, a duration where the resonance capacitor Cr is charged) is equal to a half of the reciprocal of a resonance frequency fr defined by an inductance value of the resonance inductor Lr and a capacitance value of the resonance capacitor Cr, namely, $T2=\frac{1}{2}fr=\pi\sqrt{(LrCr)}$. When the current $I_{Cr}$ flowing in the resonance capacitor Cr is zero, the current $I_{SW1}$ flowing through the first switch SW1 and the current $I_{Lo}$ flowing through the output inductor Lo are equal to each other.

When the current $I_{SW1}$ flowing through the first switch SW1 is less than the current $I_{Lo}$ flowing through the output inductor Lo, the resonance capacitor Cr starts discharge to flow a discharge current $I_{Cr}$ out of the resonance capacitor Cr. Therefore, the both-end voltage $V_{Cr}$ of the resonance capacitor Cr turns to reduce gradually.

At a time instant when the current $I_{SW1}$ flowing through the first switch SW1 becomes zero, the first switch SW1 is turned off. That is, the first switch SW1 is subjected to a zero-current switching (ZCS). Thereafter, a current $I_{BD1}$ backflows to the input power supply 11 through the first body diode BD1. At a time instant when the current $I_{BD1}$ flowing back in the first body diode BD1 becomes zero, the resonance of the series resonance circuit stops.

Inasmuch as the current $I_{Cr}$ discharging from the resonance capacitor Cr and the current $I_{Lo}$ flowing through the output inductor Lo are equal to each other, namely, $I_{Lo}=I_{Cr}$ after a time instant when the current $I_{BD1}$ flowing through the first body diode BD1 becomes zero, the resonance capacitor Cr substantially discharges at a direct current fashion. Under the circumstances, the both-ends voltage $V_{Cr}$ of the resonance capacitor Cr linearly decreases at the inclination of $I_{Lo}/Cr$.

When the resonance capacitor Cr perfectly discharges, the current $I_{BD2}$ turns to flow through toward the second body diode BD2.

It will be assumed that the second switch SW2 is turned on while the first switch SW1 is put into the off state. In this even, the current $I_{SW2}$ flows through the second switch SW2. The current $I_{SW2}$ flowing through the second switch SW2 and the current $I_{Lo}$ flowing through the output indictor Lo are equal to each other.

Thereafter, the above-mentioned operation is repeated.

In the manner which is described above, the full-wave current resonance type DC/DC converter 10 turns the energizing switch SW1 off at a time instant when the current $I_{SW1}$ backflows to resonate and becomes zero again after the current $I_{SW1}$ flowing through the energizing switch SW1 becomes zero. In addition, for a duration where the both-ends voltage $V_{Cr}$ of the resonance capacitor Cr is zero volt, the short-circuit switch SW2 is put into the on state.

In addition, the current $I_{Lr}$ flows through toward the resonance inductor Lr only for a resonance duration with respect to a switching period. The current $I_{Lr}$ does not flow through toward the resonance inductor Lr for a duration obtained by removing the resonance duration from the switching period. When an input/output voltage ratio Vin/Vout becomes smaller, the switching period with respect to the resonance duration becomes longer. As a result, durations where the current $I_{Lr}$ does not flow toward the resonance inductor Lr increase, as described, for example, in the above-mentioned U.S. Pat. No. 4,720,667 issued by Lee at al.

At any rate, the full-wave current resonance type DC/DC converter 10 illustrated in FIG. 1 has a large advantage where the zero-current switching (ZCS) of the first switch (the energizing switch) SW1 is enable by using a series resonance of the series resonance circuit consisting of the resonance inductor Lr and the resonance capacitor Cr, and it results in eliminating the switching loss.

Accordingly, to take the advantage of the full-wave current resonance type DC/DC converter 10, it is necessary to carrying out the switching of the first switch (the energizing switch) SW1 by precisely detecting a time instant when the current $I_{SW1}$ flowing through the first switch (the energizing switch) SW1 becomes zero.

Conventionally, as methods of actualizing the zero-current switching, which will later also be called ZCS for short, first and second conventional methods are adopted in the manner which will presently be described. The first conventional method (ZCS) is a method (ZCS) of inserting a detection resistor in series in the circuit. The second conventional method (ZCS) is a method (ZCS) of using a voltage drop due to an ON resistance of the energizing switch SW1 and a parasitic resistance of the resonance inductor Lr.

Figure 2:
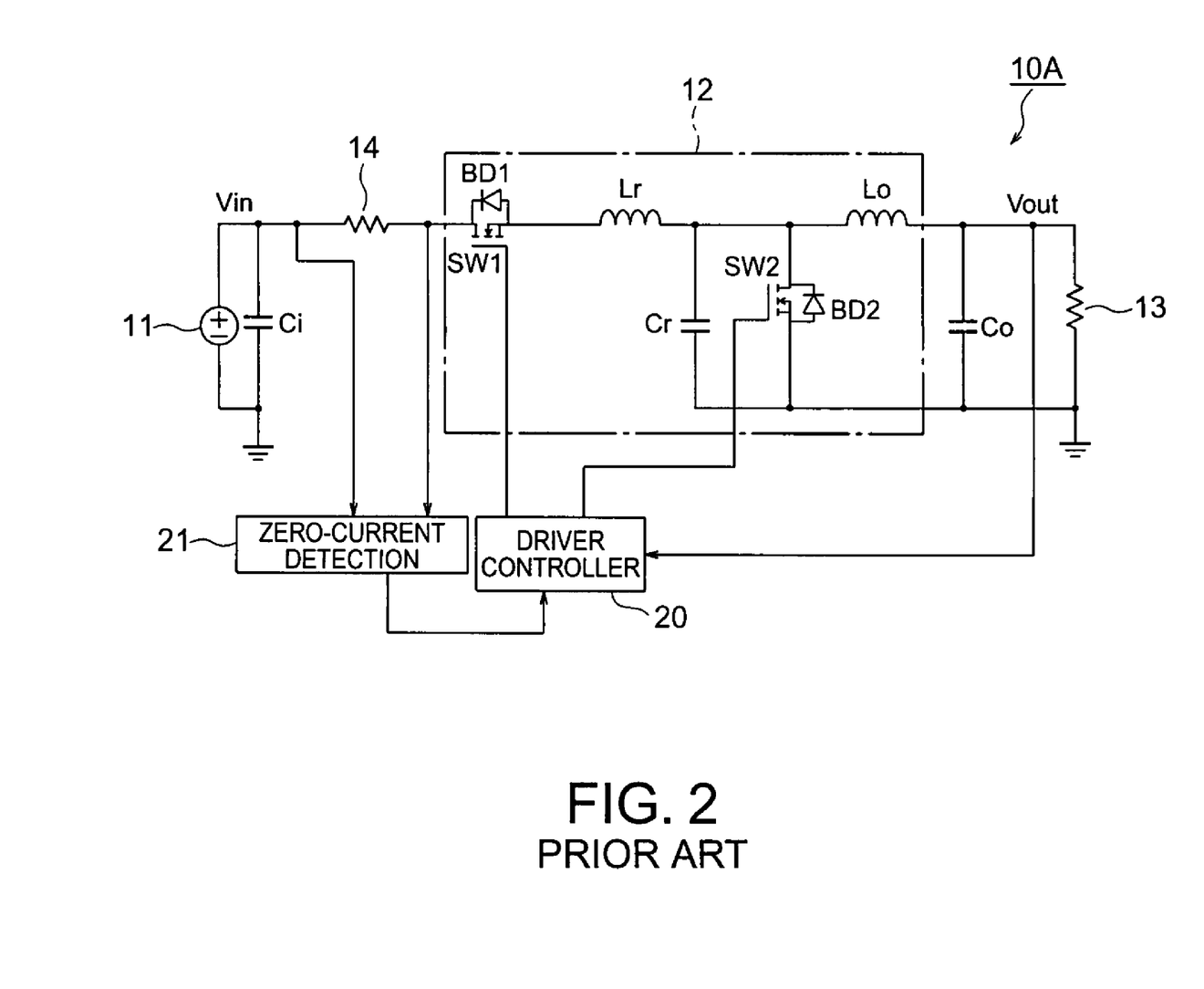
FIG. 2 is a block diagram showing the full-wave current resonance type DC/DC converter for actualizing a first conventional zero-current switching (ZCS)

Referring to FIG. 2, the description will proceed to a full-wave current resonance type DC/DC converter 10A actualizing the first conventional ZCS.

As shown in FIG. 2, the full-wave current resonance type DC/DC converter 10A is similar in structure to the full-wave current resonance type DC/DC converter 10 illustrated in FIG. 1 except that the full-wave current resonance type DC/DC converter 10A further comprises a detection resistor 14 and a zero-current detection circuit 21. The detection resistor 14 is inserted between the input power supply 11 and the energizing switch SW1 and is for detecting the current $I_{SW1}$ flowing through the energizing switch SW1. The detection resistor 14 have both ends which are connected to the zero-current detection circuit 21. When a both-ends voltage of the detection resistor 14 becomes zero volt, the zero-current detection circuit 21 sends a zero-current detected signal to the driver controller 20. That is, a combination of the zero-current detection circuit 21 and the driver controller 20 constitutes a control circuit for the full-wave current resonance type DC/DC converter 10A.

Figure 3:
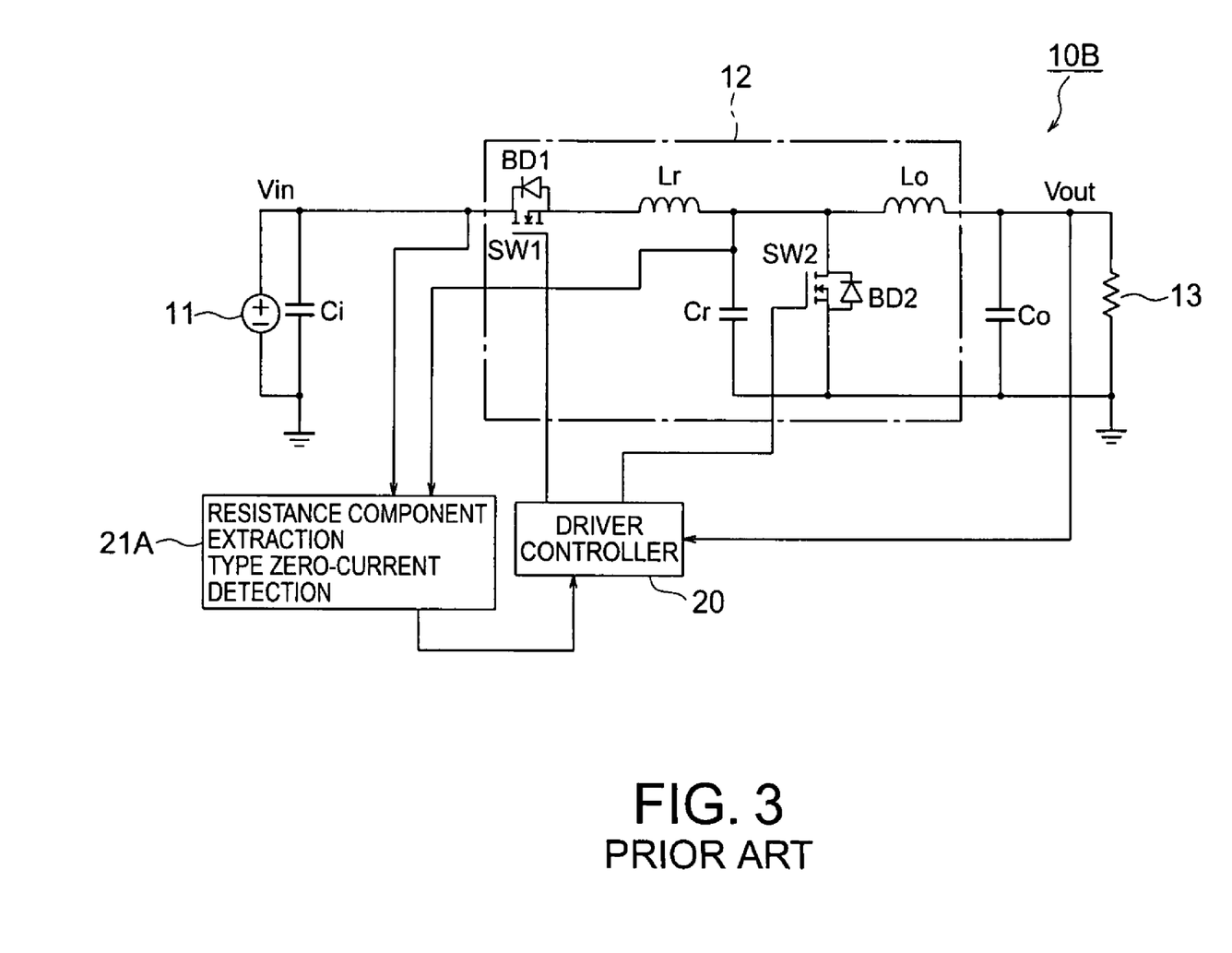
FIG. 3 is a block diagram showing the full-wave current resonance type DC/DC converter for actualizing a second conventional zero-current switching (ZCS)

Referring to FIG. 3, the description will proceed to a full-wave current resonance type DC/DC converter 10B actualizing the second conventional ZCS.

As shown in FIG. 3, the full-wave current resonance type DC/DC converter 10B is similar in structure to the full-wave current resonance type DC/DC converter 10 illustrated in FIG. 1 except that the full-wave current resonance type DC/DC converter 10B further comprises a resistance component extraction type zero-current detection circuit 21A. The resistance component extraction type zero-current detection circuit 21A is connected to the drain electrode of the energizing switch SW1 and to a connection node between the resonance inductor Lr and the resonance capacitor Cr. The resistance component extraction type zero-current detection circuit 21A detects a voltage drop due to a resistance component (which will later be called a combined resistance component) obtained by combining an ON resistance component of the energizing switch SW1 and a parasitic resistance component of the resonance resistor Lr. When the voltage drop due to the combined resistance component becomes zero volt, the resistance component extraction type zero-current detection circuit 21A sends a zero-current detected signal to the driver controller 20. That is, a combination of the resistance component extraction type zero-current detection circuit 21A and the driver controller 20 constitutes a control circuit for the full-wave current resonance type DC/DC converter 10B.

Incidentally, in practical products, the resonance frequency determined by a time constant of the resonance inductor Lr and the resonance capacitor Cr of the full-wave current resonance type DC/DC converting portion 12 is several MHz or more. Therefore, in the ZCS actualizing methods illustrated in FIGS. 2 and 3, it is necessary to make a resistance value of the detection resistor 14 or a resistance value of the combined resistance component of the energizing switch SW1 and the resonance inductor Lr a sufficient large value in comparison with a parasitic impedance component of respective parts, patterns, and so on.

To name a concrete example thereof, it will be assumed that the resonance frequency determined by the time constant of the resonance inductor Lr and the resonance capacitor Cr of the full-wave current resonance type DC/DC converting portion 12 is 2 MHz. The combined resistance component has the resistance value of several mΩ while the parasitic inductance component has an inductance value of hundreds of mΩ. Under the circumstances, it is impossible to precisely detect the current $I_{SW1}$ flowing through the energizing switch SW1.

However, if the resistance value of the detection resistor 14 or the resistance value of the combined resistance component makes larger than that of the parasitic inductance component, it is impractical because the full-wave current resonance type DC/DC converting portion 12 has a large loss.

Conversely, it may be considered to detect the current $I_{SW1}$ flowing through the energizing switch SW1 by using, as the resistance value of the detection resistor 14 or the resistance value of the combined resistance component, a small value which becomes negligible as the loss of the full-wave current resonance type DC/DC converting portion 12. In this even, however, a high-precision and complicated circuit becomes required as the zero-current detection circuit 21 or the resistance component extraction type zero-current detection circuit 21A, as mentioned in the preamble of the instant specification.

Figure 4:
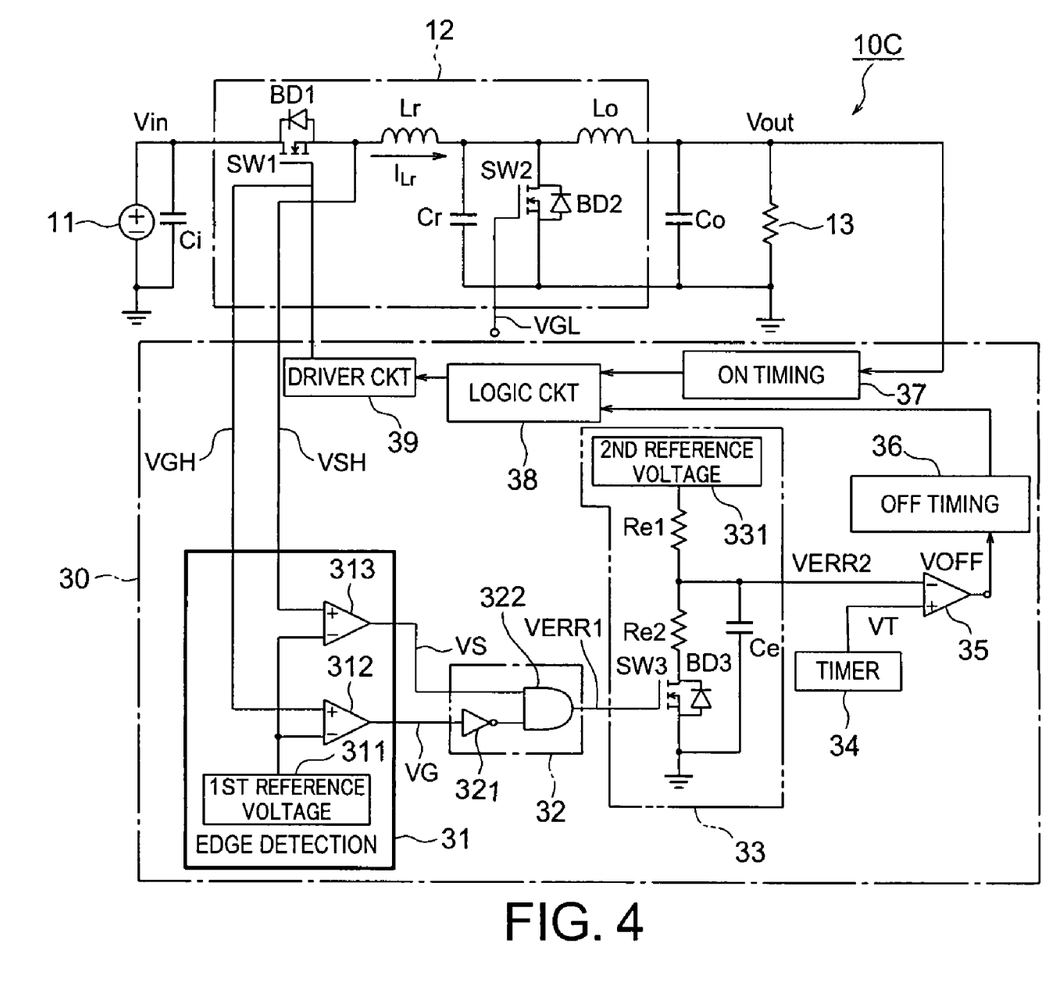
FIG. 4 is a block diagram showing a full-wave current resonance type DC/DC converter for actualizing a zero-current switching (ZCS) according to an embodiment of this invention.

Referring to FIG. 4, the description will proceed to a current resonance type DC/DC converter 10C according to an embodiment of this invention. The illustrated current resonance type DC/DC converter 10C is similar in structure to each of the current resonance type DC/DC converter 10, 10A, and 10B illustrated in FIGS. 1 to 3 except that structure of the control circuit is different from those of the current resonance type DC/DC converters 10, 10A, and 10B illustrated in FIGS. 1 to 3. Therefore, the control circuit is depicted at a reference symbol of 30. In addition, those having functions similar to those illustrated in FIG. 1 are depicted at the same reference symbols.

The illustrated current resonance type DC/DC converter 10C is a full-wave current resonance type DC/DC converter of a step-down type and a synchronous type. Accordingly, an output voltage Vout is lower than an input voltage vin. The full-wave current resonance type DC/DC converter 10C comprises the current resonance type DC/DC converting portion 12 and the control circuit 30. An input capacitor Ci is connected in parallel with an input power supply 11. An output capacitor Co is connected in parallel with a load 13. Between the input capacitor Ci and the output capacitor Co, the current resonance type DC/DC converting portion 12 is connected.

The full-wave current resonance type DC/DC converting portion 12 comprises an energizing switch SW1, a resonance inductor Lr, a resonance capacitor Cr, a short-circuit switch SW2, and an output inductor Lo,. A combination of the resonance inductor Lr and the resonance capacitor Cr constitutes a series resonance circuit. The series resonance circuit is inserted between the energizing switch SW1 and the short-circuit switch SW2.

The energizing switch SW1 is also called a first switch while the short-circuit switch SW2 is also called a second switch. Each of the energizing switch SW1 and the short-circuit switch SW2 comprises an N-channel metal oxide semiconductor field effect transistor (MOSFET). A first body diode BD1 is parasitic on the first switch SW1 while a second body diode BD2 is parasitic on the second switch SW2.

More specifically, the energizing switch SW1 has a source electrode which is equivalently connected to an anode electrode of the first body diode BD1. The energizing switch SW1 has a drain electrode which is equivalently connected to a cathode electrode of the first body diode BD1. The short-circuit switch SW2 has a source electrode which is equivalently connected to an anode electrode of the second body diode BD2. The short-circuit switch SW2 has a drain electrode which is equivalently connected to a cathode electrode of the second body diode BD2.

The energizing switch (the first switch) SW1 has an end (a drain electrode) connected to a positive electrode of the input power supply 11. The energizing switch (the first switch) SW1 has another end (a source electrode) connected to an end of the resonance inductor Lr. The resonance inductor Lr has another end which is grounded through the resonance capacitor Cr. The short-circuit switch (the second switch) SW2 is connected in parallel with the resonance capacitor Cr. Specifically, the short-circuit switch SW2 has an end (a drain electrode) connected to a connection node between the resonance inductor Lr and the resonance capacitor Cr. The short-circuit switch SW2 has another end (a source electrode) which is grounded. The other end of the resonance inductor Lr is also connected to an end of the output inductor Lo. The output inductor Lo has another end which is grounded through the output capacitor Co. The output capacitor Co has both ends between which the output voltage Vout occurs.

The first switch (the energizing switch) SW1 is also called a high-side switch while the second switch (the short-circuit switch) SW2 is also called a low-side switch. Control of turning on/off of the energizing switch SW1 and the short-circuit switch SW2 is carried out by first through second driving control signals supplied from the control circuit 30 which will later be described. More specifically, the control circuit 30 supplies, as the first driving control signal, a driving high-side gate signal VGH to the energizing switch SW1 while the control circuit 30 supplies, as the second driving control signal, a driving low-side gate signal VGL to the short-circuit switch SW2.

Although the control circuit 30 comprises a first control portion for generating the driving high-side gate signal VGH and a second control portion for generating the driving low-side gate signal VGL, the second control portion is omitted from the control circuit 30 because the present invention relates to the first control portion.

In the manner which is described above, turning on/off of the energizing switch SW1 is controlled by the driving high-side gate signal VGH supplied from the control circuit 30. In addition, the control circuit 30 is supplied with the driving high-side gate signal VGH and a particular voltage between the energizing switch SW1 and the resonance inductor Lr. The particular voltage will later be called a high-side source voltage. In the manner which will later be described, the control circuit 30 generates the driving high-side gate signal VGH so as to turn the energizing switch SW1 off at a timing when a current $I_{SW1}$ flowing through the energizing switch SW1 substantially becomes zero by a feedback loop using the driving high-side gate signal VGH and the high-side source voltage VSH.

Specifically, the control circuit 30 comprises an edge detection circuit 31, a first error signal generating circuit 32, a second error signal generating circuit 33, a timer 34, a comparator 35, an off timing generating circuit 36, an on timing generating circuit 37, a logic circuit 38, and a driver circuit 39.

The edge detection circuit 31 responds to the driving high-side gate signal VGH and the high-side source voltage VSH to produce a logic gate signal VG and a logic source signal VS, respectively. The logic gate signal VG is also called a logic control signal while the logic source signal is also called a logic voltage signal. The edge detection circuit 31 comprises a first reference voltage generating circuit 311 for generating a first reference voltage, a first comparison circuit 312 for comparing the driving high-side gate signal VGH with the first reference voltage to produce the logic gate signal VG, and a second comparison circuit 313 for comparing the high-side source voltage VSH with the first reference voltage to produce the logic source signal VS.

The first comparison circuit 312 has an inverting input terminal supplied with the first reference voltage and a non-inverting input terminal supplied with the driving high-side gate signal VGH. When the driving high-side gate signal VGH is higher than the first reference voltage, the first comparison circuit 312 produces the logic gate signal VG having a logic high level. When the driving high-side gate signal VGH is lower than the first reference voltage, the first comparison circuit 312 produces the logic gate signal VG having a logic low level.

The second comparison circuit 313 has an inverting input terminal supplied with the first reference voltage and a non-inverting input terminal supplied with the high-side source voltage VSH. When the high-side source voltage VSH is higher than the first reference voltage, the second comparison circuit 313 produces the logic source signal VS having a logic high level. When the high-side source voltage VSH is lower than the first reference voltage, the second comparison circuit 313 produces the logic source signal VS having a logic low level.

The first error signal generating circuit 32 responds to the logic gate signal VG and the logic source signal VS to produce a first error signal VERR1 indicative of an error amount. The first error signal generating circuit 32 comprises an inverter gate 321 and an AND gate 322. The inverter gate 321 inverts the logic gate signal VG to produce an inverted logic gate signal. The AND gate 322 ANDs the inverted logic gate signal and the logic source signal VS to produce an ANDed result signal as the first error signal VERR1. The first error signal VERR1 is a signal indicative of, as a length on a time base, an error size (an error amount) between the driving high-side gate signal VGH and the high-side source signal VSH. Accordingly, the first error signal VERR1 is called a time-base error signal.

At any rate, the first error signal generating circuit 32 serves as an error amount calculating arrangement for calculating the error amount on the basis of the logic control signal (the logic gate signal) VG and the logic voltage signal (the logic source signal) VS.

The second error signal generating circuit 33 responds to the first error signal (the time-base error signal) to produce a second error signal VERR2. The second error signal VERR2 is a signal indicative of, as a voltage level, a level of the error size (the error amount) between the driving high-side gate signal VGH and the high side source signal VSH. Accordingly, the second error signal VERR2 is called a voltage level error signal. At any rate, the second error signal generating circuit 33 acts as a time-base/voltage level converting arrangement for converting the time-base error signal VERR1 into the voltage level error signal VERR2.

The second error signal generating circuit 33 comprises a second reference voltage generating circuit 331 for generating a second reference voltage, a first resistor Re1 having an end connected to the second reference voltage generating circuit 331, a second resistor Re2 having an end connected to another end of the first resistor Re1, a third switch SW3 which is connected between another end of the second resistor Re2 and a ground terminal and which is supplied with the first error signal VERR1, and a capacitor Ce connected between a connection node between the first resistor Re1 and the second resistor Re2 and the ground terminal.

The third switch SW3 comprises an N-channel metal oxide semiconductor field effect transistor (MOSFET). A third body diode BD3 is parasitic on the third switch SW3. The third switch SW3 has a source electrode which is equivalently connected to an anode electrode of the third body diode BD3. The third switch SW3 has an drain electrode which is equivalently connected to a cathode electrode of the third body diode BD3. The source electrode of the third switch SW3 is grounded. The drain electrode of the third switch SW3 is connected to the other end of the second resistor Re2. The third switch SW3 has a gate electrode which is supplied with the first error signal (the time-base error signal) VERR1.

With such a structure of the second error signal generating circuit 33, the third switch SW3 is turned on while the first error signal VERR1 has the high level, charges accumulated in the capacitor Ce are discharged, it results in lowering a voltage level of the second error signal VERR2. On the other hand, while the first error signal VEER1 has the low level, the third switch SW3 is turned off and it results in rising the voltage level of the second error signal VEER2 because the capacitor Ce is charged through the first resistor Re1 from the second reference voltage generating circuit 331. In the manner which is described above, the second error signal generating circuit 33 converts the first error signal (the time-base error signal) into the second error signal (the voltage level error signal).

The timer 34 generates a timer signal VT having a predetermined sawtooth waveform where a voltage level gradually lowers and sharply raises in the manner which will later be described.

The comparator 35 is a circuit for comparing the timer signal VT with the second error signal (the voltage level error signal) VERR2 to produce a comparison result signal. The comparison result signal determines a trailing edge of an off timing signal VOFF. Specifically, the comparator 35 has a noninverting input terminal supplied with the timer signal VT and an inverting input terminal supplied with the second error signal (the voltage level error signal) VERR2. When the timer signal VT is higher than the second error signal (the voltage level error signal), the comparator 35 produces, as the comparison result signal, the off timing signal VOFF having a logic high level. Conversely, when the timer signal VT is lower than the second error signal (the voltage level error signal), the comparator 35 produces, as the comparison result signal, the off timing signal VOFF having a logic low level. By the trailing edge timing of the off timing signal VOFF, an off timing (a trailing edge) of the driving high-side gate signal VGH is determined.

The off timing generating circuit 36 responds to the comparison result signal (the off timing signal) VOFF to generate an off timing signal for the driving high-side gate signal VGH.

At any rate, a combination of the second error signal generating circuit 33, the timer 34, the comparator 35, and the off timing generating circuit 36 serves as an off timing determining arrangement for determining the off timing of the energizing switch SW1 so as to making the error amount small. The off timing determining arrangement produces a determined off timing.

The on timing generating circuit 37 generates an on timing signal for the driving high-side gate signal VGH on the basis of the output voltage Vout. The logic circuit 38 produces an original high-side gate signal on the basis of the off timing signal for the driving high-side gate signal VGH and the on timing signal for the driving high-side gate signal VGH. Responsive to the original high-side gate signal, the driver circuit 39 supplies the driving high-side gage signal VGH to the gate electrode of the energizing switch SW1.

Accordingly, a combination of the logic circuit 38 and the driver circuit 39 acts as a driving control signal generating arrangement for generating the first driving control signal VGH on the basis of the determined off timing.

Figure 5A:
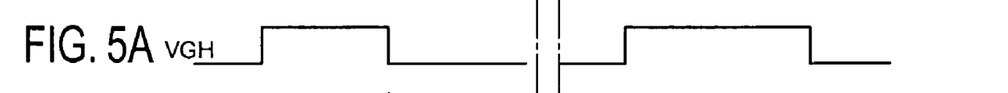
FIGS. 5A through 5H are time charts for use in describing operation of the full-wave resonance type DC/DC converter illustrated in FIG. 4.
Figure 5B:
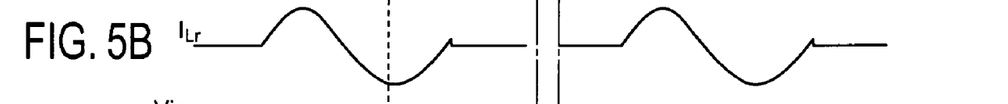
Figure 5C:
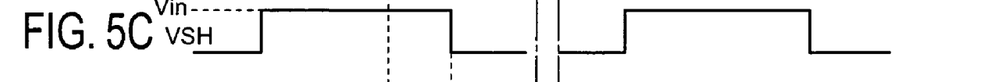
Figure 5D:
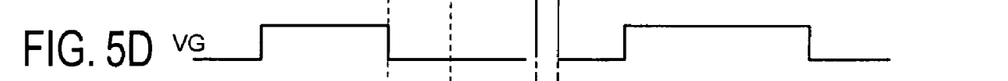
Figure 5E:
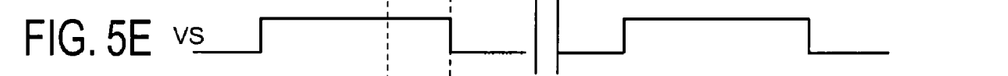
Figure 5F:
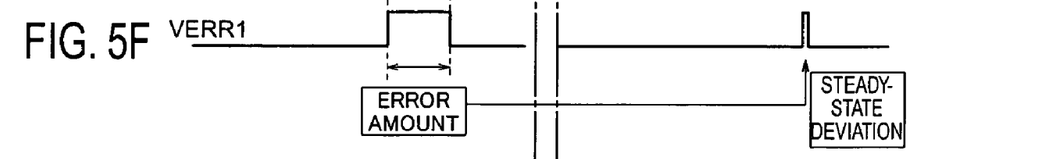
Figure 5G:
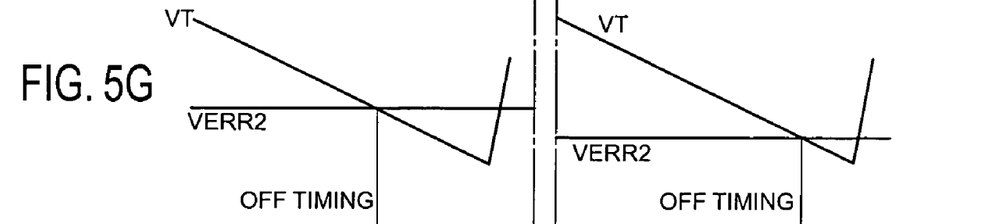
Figure 5H:
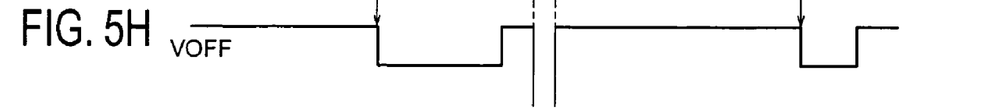

FIGS. 5A through 5H are time charts for use in describing operation of the current resonance type DC/DC converter 10C illustrated in FIG. 4. FIG. 5A shows a waveform of the driving high-side gate signal VGH. FIG. 5B shows a waveform of a current (a resonance current) $I_{Lr}$ flowing through the resonance inductor Lr. FIG. 5C shows a waveform of the high-side source voltage VSH. FIG. 5D shows a waveform of the logic gate signal VG. FIG. 5E shows a waveform of the logic source signal VS. FIG. 5F shows a waveform of the first error signal (the time-base error signal) VERR1. FIG. 5G shows a waveform of the second error signal (the voltage level error signal) VERR2 and a waveform of the timer signal VT. FIG. 5H shows a waveform of the off timing signal VOFF. In addition, the resonance current $I_{Lr}$ has a positive value at a direction when the resonance current $I_{Lr}$ flows from the resonance inductor Lr to the resonance capacitor Cr. The resonance current $I_{Lr}$ has a negative value at another direction when the resonance current $I_{Lr}$ flows from the resonance inductor Lr to the energizing switch SW1.

Referring now to a left-side of the FIGS. 5A to 5H, description will be made as regards operation in a case where the current resonance type DC/DC converter 10C is put into a transient state.

When the driving high-side gate signal VGH takes the logic high level, the energizing switch SW1 is turned on, the series resonance circuit consisting of the resonance inductor Lr and the resonance capacitor Cr turns to resonate, and the resonance current $I_{Lr}$ flows in the resonance inductor Lr, as shown in FIG. 5B. When the energizing switch SW1 is turned on, the high side source voltage VSH becomes equal to the input voltage Vin, as shown in FIG. 5C. On the other hand, inasmuch as the driving high-side gate signal VGH takes the logic high level, the edge detection circuit 31 produces the logic gate signal VG having the logic high level, as shown in FIG. 5D. In addition, inasmuch as the high-side source voltage VSH becomes equal to the input voltage Vin, the edge detection circuit 31 produces the logic source signal VS having the logic high level, as shown in FIG. 5E.

Inasmuch as the second error signal (the voltage level error signal) VERR2 generated by the second error signal generating circuit 33 has a high voltage level in the transient state, the voltage level of the timer signal VT becomes lower than the voltage level of the second error signal VERR2 before the resonance current $I_{Lr}$ becomes zero (see FIG. 5G). At this time instant, the comparator 35 produces the off timing signal VOFF having the logic low level, as shown in FIG. 5H. Supplied with the off timing signal VOFF through the off timing generating circuit 36 and the logic circuit 38, the driver circuit 39 changes the driving high-side gate signal VGH from the logic high level to the logic low level (see FIG. 5A). Therefore, the energizing switch SW1 is turned off. Inasmuch as the resonance current $I_{Lr}$ has the negative value at a time when the energizing switch SW1 is turned off in this example, the resonance current $I_{Lr}$ keeps on flowing through the first body diode (a parasitic diode) BD1 as it is.

At the same time, inasmuch as the driving high-side gate signal VGH takes the logic low level, the logic gate signal VG changes from the logic high level to the logic low level (see FIG. 5D). Inasmuch as the logic gate signal VG takes the logic low level and the logic source signal VS takes the logic high level, the first error signal generating circuit 33 generates the first error signal VERR1 having the logic high level (see FIG. 5F).

As shown in a portion enclosed by a circle of the FIG. 5B, the first body diode (parasitic diode) BD1 is turned off at a time when the resonance current $I_{Lr}$ flows in a positive side by an amount corresponding to a recovered current of the first body diode (parasitic diode) BD1 after the resonance current $I_{Lr}$ reaches zero from a negative side. Inasmuch as the recovered current flows from the resonance inductor Lr to the resonance capacitor Cr, the high-side source voltage VSH makes a HIGH to LOW transition caused by a counter-electromotive force generated by the resonance inductor Lr the moment at which the first body diode (parasitic diode) BD1 is turned off (see FIG. 5C).

Inasmuch as the high-side source voltage VSH makes the HIGH to LOW transition, the logic source signal VS produced by the edge detection circuit 31 changes from the logic high level to the logic low level (see FIG. 5E). Therefore, generated by the first error signal generating circuit 32, the first error signal (the time-base error signal) VERR1 changes from the logic high level to the logic low level (see FIG. 5F).

A duration where the first error signal (the time-base error signal) VERR1 takes the logic high level defines the error amount on the time base. Inasmuch as the error amount is large in the transient state, the third switch SW3 in the second error signal generating circuit 33 is turned on for a long time and it results in lowering the voltage level of the second error signal (the voltage level error signal). That is, the control circuit 30 provides a feedback loop so as to minimize the error amount indicative of the duration between the trailing edge of the driving high-side gate signal VGH and the trailing edge of the high-side source voltage VSH.

Referring now to a right-side of FIGS. 5A to 5H, description will be made as regards operation in another case where the current resonance type DC/DC converter 10 is put into a steady state.

When the driving high-side gate signal VGH takes the logic high level, the energizing switch SW1 is turned on, the series resonance circuit consisting of the resonance inductor Lr and the resonance capacitor Cr turns to resonate and the resonance current $I_{Lr}$ flows in the resonance inductor Lr, as shown in FIG. 5B. When the energizing switch SW1 is turned on, the high-side source voltage VSH becomes equal to the input voltage Vin, as shown in FIG. 5C. On the other hand, inasmuch as the driving high-side gate signal VGH becomes the logic high level, the edge detection circuit 31 produces the logic gate signal VG having the logic high level (see FIG. 5D). In addition, inasmuch as the high-side source voltage VSH becomes equal to the input voltage Vin, the logic source signal VS also becomes the logic high level (see FIG. 5E).

Inasmuch as the second error signal (the voltage level error signal) VERR2 generated by the second error signal generating circuit 33 has a low voltage level in the steady state, the voltage level of the timer signal VT becomes lower than the voltage level of the second error signal VERR2 in the vicinity when the resonance current $I_{Lr}$ becomes from the negative value to zero (see FIG. 5G). At this time instant, the comparator 35 produces the off timing signal VOFF having the logic low level. Supplied with the off timing signal through the off timing generating circuit 36 and the logic circuit 38, the driver circuit 39 changes the driving high-side gate signal VGH from the logic high level to the logic low level (see FIG. 5A).

At the same time, inasmuch as the driving high-side gate signal VGH becomes the logic low level, the logic gate signal VG changes from the logic high level to the logic low level (see FIG. 5D) . Inasmuch as the logic gate signal VG has the logic low level and the logic source signal VS has the logic high level, the first error signal generating circuit 32 generates the first error signal VERR1 having the logic high level (FIG. 5F).

In the manner which is described above, the first body diode (parasitic diode) BD1 is turned off at a time when the resonance current $I_{Lr}$ flows in the positive side by the amount corresponding to the recovered current of the first body diode (parasitic diode) BD1 after the resonance current $I_{Lr}$ reaches from the negative value to zero. Inasmuch as this recovered current flows from the resonance inductor Lr to the resonance capacitor Cr, the high-side source voltage VSH make the HIGH to LOW transition caused by the counter-electromotive force generated by the resonance inductor Lr the moment at which the first body diode (parasitic diode) BD1 is turned off (see FIG. 5C).

In as much as the high-side source voltage VSH make the HIGH to LOW transition, the logic source signal VS produced by the edge detection circuit 31 changes the logic high level to the logic low level (see FIG. 5E). Therefore, generated by the first error signal generating circuit 32, the first error signal (the time-base error signal) VERR1 changes the logic high level to the logic low level (see FIG. 5F).

In the steady state, the duration where the first error signal (the time-base error signal) VERR1 takes the logic high level defines a steady-state deviation In the manner which is described above, the control circuit 30 can actualize the zero-current switching (ZCS) with the steady-state deviation having a small error amount. In other words, it is understood that the off timing of the driving high-side gate signal VGH approaches a time instant when the resonance current $I_{Lr}$ becomes zero.

In addition, if the energizing switch SW1 is turned off with the resonance current $I_{Lr}$ put into the positive side by a large amount, a large electromotive force occurs in the resonance inductor Lr. As a result, in a real current resonance type DC/DC converter, it contributes to crash of the energizing switch SW1 or the like. Therefore, the off timing of the energizing switch SW1 desirably may be stable just before the resonance current $I_{Lr}$ becomes zero.

In the illustrated control circuit 30, by suitably selecting (determining) resistance values the resistors Re1 and Re2 and a capacitance value of the capacitor Ce in the second signal generating circuit 33, the off timing of the energizing switch SW1 is automatically stable just before of a zero-current point of the resonance current $I_{Lr}$ by the steady-state deviation according to a switching speed (that is, a minimum time interval enable to turning on and off) of the third switch SW3.

In the manner described above, according to the current resonance type DC/DC converter 10C, it is possible to actualize a stable zero-current switching (ZCS) without an increased loss and detection of the current flowing through the energizing switch SW1 by assembling a complicated circuit. It is therefore possible to drastically decrease a loss caused by a forward voltage Vf of the parasitic diode BD1 and the resonance current $I_{Lr}$ and it is possible to decrease the switching loss by the zero-current switching. In addition, inasmuch as the control circuit 30 constitutes the feedback loop, it may take a loop characteristic into account and then the current resonance type DC/DC converter 10C can operate with stability without reference to unevenness of characteristics of respective parts or the like.

Furthermore, in as much as a feedback circuit is used as the control circuit 30, it is possible to turn the energizing switch SW1 off at the negative side just before the zero-current point of the resonance current $I_{Lr}$ with the steady-state deviation in the steady state and the current resonance type DC/DC converter 10C is advantageous in that it operates with safety. In the real current resonance type DC/DC converter, by detecting the driving high-side gate signal VGH and the high-side source voltage VSH in the vicinity of the energizing switch SW1, the feedback loop of the control circuit 30 corrects delays in the driver circuit 39 and the logic circuit 38 or the like. Accordingly, the illustrated control circuit 30 eliminate the necessity to take into account the delays from the edge detection circuit 31 to the driver circuit 39.

Although the MOSFETs are used as the switches in the example being illustrated in FIG. 4, bipolar transistors, junction FETs, or the like are used as the switches.

While this invention has thus far been described in conjunction with a preferred embodiment thereof, it will now readily possible for those skilled in the art to put this invention into various manners. For example, although the full-wave current resonance type DC/DC converter of the step-down type and the synchronous type is exemplified in the abovementioned embodiment, this invention may be applicable to a step-up type, a polarity reversing type, or other types and the full-wave current resonance type DC/DC converter may be an asynchronous type. In a case of the asynchronous type, a diode is used in place of the short-circuit switch SW2.

What is claimed is:

1. A method of performing a zero-current switching of an energizing switch in a current resonance type DC/DC converter, wherein said current resonance type DC/DC converter includes said energizing switch which is turned on/off in response to a driving control signal that is directly supplied to said energizing switch, a resonance inductor having an end connected to said energizing switch, and a resonance capacitor having an end connected to another end of said resonance inductor, said method comprising:

detecting edges of the driving control signal being supplied to said energizing switch to produce a logic control signal;

detecting edges of a particular voltage between said energizing switch and said resonance inductor to produce a logic voltage siginal;

calculating an error amount between the driving control siginal being supplied to said energizing switch and the particular voltage between said energizing switch and said resonance inductor based on the logic control signal and the logic voltage signal;

determining an off timing of said energizing switch based on the calculated error amount so as to reduce the error amount to produce a determined off timing;

generating a new driving control signal based on the determined off timing which, when supplied to said energizing switch, will cause said energizing switch to turn off at a timing when a current flowing through said energizing switch substantially becomes zero;

supplying the new driving control signal to said energizing switch; and repeating the foregoing steps to thereby form a feedback loop using the driving control signal and the particular voltage between said energizing switch and said resonance inductor.

2. A current resonance type DC/DC converter comprising a current resonance type DC/DC converting portion which includes an energizing switch that is turned on/off in response to a driving control signal directly supplied to said energizing switch, a resonance inductor having an end connected to said energizing switch, and a resonance capacitor having an end connected to another end of said resonance inductor, wherein said current resonance type DC/DC converter comprises:

a control circuit for generating the driving control signal so as to turn said energizing switch off at a timing when a current flowing through said energizing switch substantially becomes zero by a feedback loop using the driving control signal and a particular voltage between said energizing switch and said resonance inductor, wherein said control circuit comprises:

an edge detection circuit for detecting edges of the driving control signal being supplied to said energizing switch to produce a logic control signal and for detecting edges of the particular voltage to produce a logic voltage signal;

an error amount calculating arrangement for calculating an error amount between the driving control signal being supplied to said energizing switch and the particular voltage between said energizing switch and said resonance inductor based on the logic control signal and the logic voltage signal;

an off timing determining arrangement for determining an off timing of said energizing switch based on the calculated error amount so as to reduce the error amount, said off timing determining arrangement producing a determined off timing; and a driving control signal generating arrangement for generating a new driving control signal based on the determined off timing which, when supplied to said energizing switch, will cause said energizing switch to turn off at the timing when the current flowing through said energizing switch substantially becomes zero, the new driving control signal being supplied to said energizing switch.

3. The current resonance type DC/DC converter as claimed in claim 2, wherein said current resonance type DC/DC converting portion comprises a full-wave current resonance type DC/DC converting portion.

4. The current resonance type DC/DC converter as claimed in claim 3, wherein said full-wave current resonance type DC/DC converting portion comprises a step-down full-wave current resonance type DC/DC converting portion.

5. The current resonance type DC/C converter as claimed in claim 2, wherein said energizing switch comprises an N-channel metal oxide semiconductor field effect transistor (MOSFET), the driving control signal comprises a driving gate signal supplied to a gate electrode of said N-channel MOSFET, and said particular voltage comprises a source voltage between a source electrode of said N-channel MOSFET and the end of said resonance inductor, and wherein said edge detection circuit comprises:
- a reference voltage generating circuit for generating a reference voltage;
- a first comparison circuit for comparing the reference voltage with the driving gate signal to produce, as the logic control signal, a logic gate signal; and
- a second comparison circuit for comparing the reference voltage with the source voltage to produce, as the logic voltage signal, a logic source signal.

6. The current resonance type DC/DC converter as claimed in claim 5, wherein said error amount calculating arrangement comprises:
- an inverter gate for inverting the logic gate signal to produce an inverted logic gate signal; and
- an AND gate for ANDing the inverted logic gate signal and the logic source signal to produce an ANDed result signal as a time-base error signal indicative of a length of the error signal on a time base.

7. The current resonance type DC/DC converter as claimed in claim 6, wherein said off timing determining arrangement comprises:
- a time-base/voltage level converting arrangement for converting the time-base error signal into a voltage level error signal;
- a timer for producing a timer signal having a predetermined sawtooth waveform;
- a comparator for comparing the voltage level error signal with the timer signal to produce a comparison result signal; and
- an off timing generating circuit for generating, in response to the comparison result signal, an off timing signal indicative of the off timing of said energizing switch.

8. The current resonance type DC/DC converter as claimed in claim 7, wherein said driving control signal generating arrangement comprises:
- a logic circuit for producing an original gate signal in response to the off timing signal; and
- a driver circuit for supplying the driving gate signal to the gate electrode of said energizing switch in response to the original gate signal.

* * * * *